United States Patent [19]

Courtois et al.

[11] 4,384,698
[45] May 24, 1983

[54] DEVICES FOR ADJUSTING THE HEIGHT AND INCLINATION OF A SEAT

[75] Inventors: Bernard Courtois, Etampes; Alain Letournoux, Saint-Jean-le-Blanc, both of France

[73] Assignee: Societe Industrielle Bertrand Faure, Etampes, France

[21] Appl. No.: 163,480

[22] Filed: Jun. 27, 1980

[30] Foreign Application Priority Data

Jun. 27, 1979 [FR] France ......................... 79 16630

[51] Int. Cl.³ ..................... A45D 19/04; A47J 47/16
[52] U.S. Cl. .................................. 248/396; 297/330
[58] Field of Search ............... 248/396, 395, 394, 393, 248/397; 297/330

[56] References Cited

U.S. PATENT DOCUMENTS

| 2,321,716 | 6/1943 | Wahlberg | 248/395 |
| 2,892,483 | 6/1959 | De Rose | 248/394 |
| 3,188,044 | 6/1965 | Epple | 248/394 X |

FOREIGN PATENT DOCUMENTS

| 2604620 | 9/1977 | Fed. Rep. of Germany | 248/396 |
| 2450714 | 11/1980 | France | 248/396 |

Primary Examiner—Francis K. Zugel

[57] ABSTRACT

For adjusting the height and inclination of the sitting portion of a seat with respect to the base of this seat, two mechanisms are provided placed respectively between these two sub-assemblies, at the front and at the rear of the seat.

Each mechanism comprises, on each side of the seat, two horizontal bearing surfaces integral with the base, a horizontal shaft connected vertically to the sitting portion and pivotably mounted thereon, two flat Archimedes-spiral cams in opposite directions integral with the shaft and placed jointingly between the bearing surfaces, and electric means for causing said shaft to rotate, these means allowing the shaft of the front mechanism, that of the rear mechanism or both at the same time to be rotated at will.

12 Claims, 5 Drawing Figures

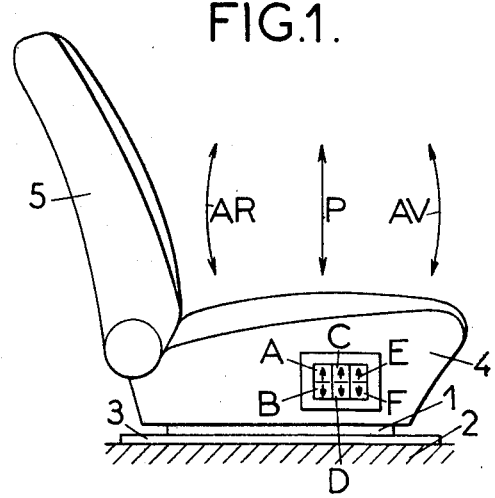
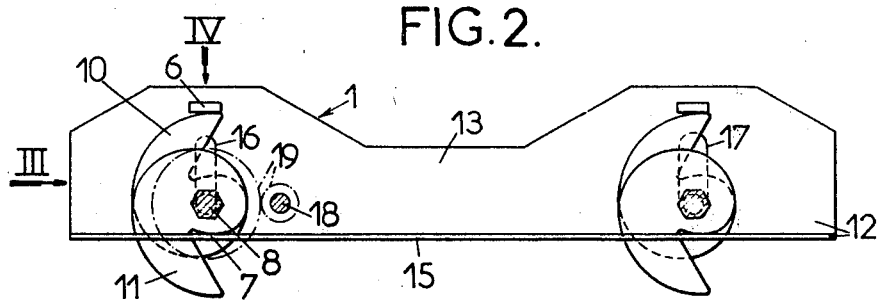
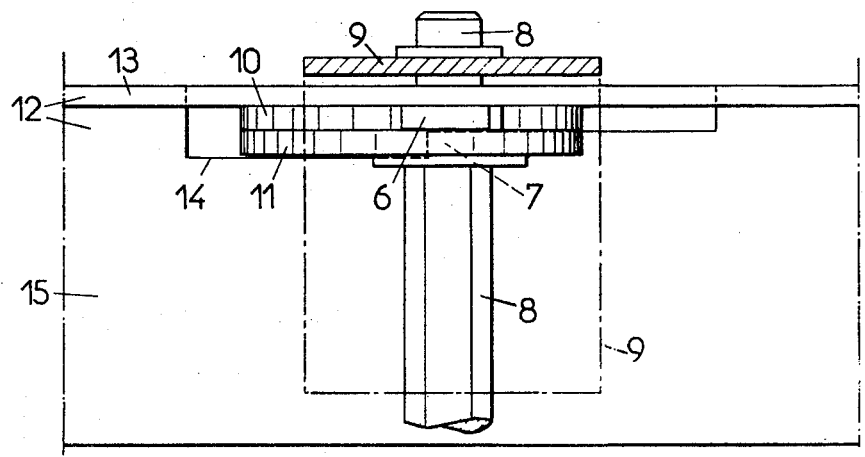

DEVICES FOR ADJUSTING THE HEIGHT AND INCLINATION OF A SEAT

BACKGROUND AND SUMMARY OF THE INVENTION

The invention relates to devices for adjusting a seat in height and in inclination.

It relates more particularly to the cases where the seats in question comprise a base frame adapted to be fixed to the floor of the vehicle, possibly by means of a slide allowing longitudinal adjustment, and a sitting-portion frame mounted on this base frame by means of two separate mechanisms disposed one in front and the other at the rear of the seat and both operable by the person sitting in this seat, each of these mechanisms being arranged so as to allow adjustment of the vertical distance between one point of the base frame and a point of the sitting-portion frame, then to maintain this distance constant after adjustment.

The invention has especially as its aim to make the mechanisms in question such that they are simpler than those known at present, more robust than these latter, that they allow continuous adjustments and that they lend themselves to electric controls.

Each of the mechanisms of the kind in question in accordance with the invention is essentially characterized in that it comprises, on each side of the seat:

two horizontal bearing surfaces spaced vertically apart by a distance D and provided on one of the two frames (base and sitting portion), the upper bearing surface being orientated downwards and the lower bearing surface upwards, a horizontal shaft vertically connected to the other frame and pivotably mounted thereon, two flat Archimedes-spiral cams with identical ratios, but in opposite directions, interlocked angularly together and with the shaft so that the distance between two parallel planes applied respectively in opposite directions against two areas of these two cams is equal to D and remains so during rotation of these cams with respect to these planes, said cams being disposed vertically between the two bearing surfaces so that each of them is slidingly engaged with one of these bearing surfaces, and a member operable by the person seated to control at will the rotations of the shaft in one or other direction.

These rotations of the shaft of the front or rear mechanism considered result in modifying the height of this shaft with respect to the bearing surfaces of this mechanism, so the height of the sitting-portion frame with respect to the base frame, and in short, the height of the seat immediately above said mechanism.

In preferred embodiments, recourse is had further to one and/or the other of the following arrangements:

the slope of the straight lines corresponding to the developed curve of each Archimedes spiral is of the order of 7°, the effective area of each cam extends over an angle of 360°, in an adjusting device in accordance with the two preceding paragraphs, the height of adjustment of each mechanism is of the order of 30 mm, which corresponds to a cam radius increasing from about 15 to about 45 mm and to a distance D of the order of 60 mm, the shafts of the two mechanisms extend transversely with respect to the seat, the shaft of one of the two mechanisms is jointingly overlapped by an aperture with vertical parallel edges provided in the frame to which this shaft is not vertically connected, and the shaft of the other mechanism is mounted so as to be able to move slightly in the longitudinal direction of the seat, the two bearing surfaces are provided on the base frame, which comprises two longitudinal angle-irons having a vertical flange and a horizontal flange, the upper bearing surface of each mechanism is a lug integral with the vertical flange of such an angle-iron, and its lower bearing surface is the stepped edge of a slot provided in the horizontal flange of said angle-iron and adapted to let pass portions of the two cams, the shafts of the two mechanisms are connected to an electric unit operable by the person seated and allowing the six following manoeuvres at will: driving the first shaft alone in one or the other direction, driving the two shafts simultaneously in one and the other direction, and driving the second shaft alone in one and the other direction, in an adjusting device in accordance with the preceding paragraph, means are provided for automatically interrupting the operation of the two mechanisms when, with any one of the controls being brought into use, one of these two mechanisms reaches its end-of-travel stop, in a device in accordance with at least the paragraph which precedes the preceding one, means are provided for giving priority to the simultaneous controls of the two shafts over the other four controls, in an adjusting device in accordance with the preceding paragraph, the electric unit comprises: a DC source, two small electric motors, and three control change-over switches, i.e. a first change-over switch mounted so as to connect the source to the first motor in one direction or in the other through the mobile contacts of two de-energized relays, a second change-over switch mounted so as to connect the source to the second motor in one direction or in the other through the mobile contacts of two other de-energized relays, and a third change-over switch mounted so as to connect the source in one direction or in the other simultaneously, on the one hand to the four relays and, on the other hand, to the two motors through the mobile contacts of these four relays then energized, in an adjusting device in accordance with the preceding paragraph, the change-over switches are aligned from rear to front with the side of the seat and each carries an upwardly or downwardly directed arrow corresponding to the control provided by pressing this arrow.

The invention comprises, apart from these principal arrangements, certain other arrangements which are preferably used at the same time and which will be more explicitly discussed hereafter.

BRIEF DESCRIPTION OF THE ACCOMPANYING DRAWINGS

In what follows, a preferred embodiment of the invention will be described with reference to the accompanying drawings in a way which is of course in no wise limiting.

FIG. 1 of these drawings shows very schematically a motorvehicle seat equipped with an electric device for height and inclination adjustment constructed in accordance with the invention.

FIG. 2 shows in longitudinal vertical section the essential part of this device.

FIGS. 3 and 4 are two partial enlarged views of the same device respectively along arrows III and IV of FIG. 2.

DETAILED DESCRIPTION OF THE PREFERRED EXEMPLARY EMBODIMENT

Figure 3:
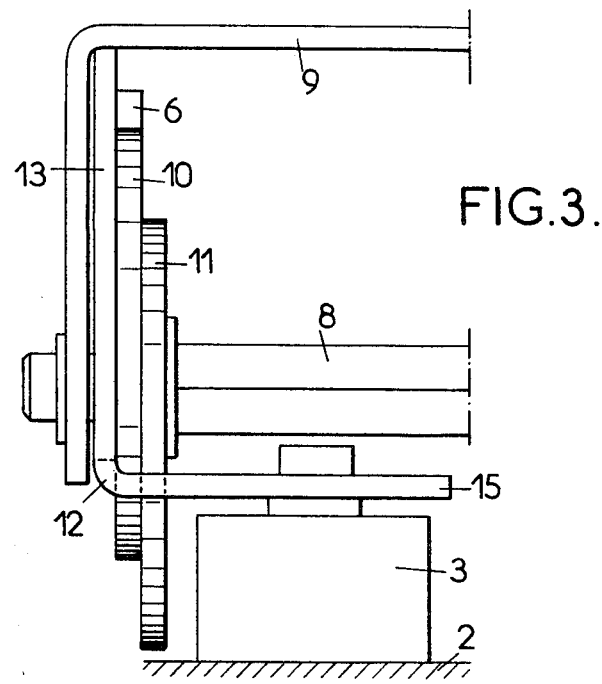

The vehicle seat considered comprises in a way known per se:

a base 1 mounted on the floor 2 of the vehicle by means of slides for longitudinal adjustment 3, a sitting portion 4 mounted with its seat back 5 on base 1, a front mechanism for separately adjusting the height of the front of the sitting portion along arrow AV of FIG. 1, and a rear mechanism for separately adjusting the height of the rear of the sitting portion along arrow AR of FIG. 1.

The combination of these front and rear adjustments enables not only the inclination of the seat, but also its height to be controlled at will.

Each of the two front and rear mechanisms comprises in reality two identical elementary mechanisms, disposed respectively on both sides of the seat and controlled from the rotation of the same transverse horizontal shaft: in the present description, by "mechanism" is meant one of these elementary mechanisms.

Each of these mechanisms comprises:

two horizontal bearing surfaces 6 and 7 spaced apart by a vertical distance D and integral with the frame of base 1 and orientated respectively, the upper bearing surface 6 downwards and the lower bearing surface 7 upwards, a horizontal shaft 8 connected vertically to the frame 9 of sitting portion 4 and pivotably mounted on this frame, the assembly of two flat Archimedes-spiral cams 10 and 11 having identical ratios and in opposite directions, interlocked angularly together and with shaft 8 so that they may cooperate with bearing surfaces 6 and 7, as will be explained herebelow, and a member operable by the person seated for controlling at will the rotation of shaft 8 in both directions thereof.

It will be recalled that an Archimedes spiral is defined by the equation $r=a\theta$, in which r is the length of the radius joining the centre of the spiral to each point thereof, a the ratio, and $\theta$ the angle between the radius of origin and the considered radius: in other words, the length of the radius generating the spiral increases linearly with angular movement thereof proportionally to the ratio a.

If two flat cams defined by such spirals having the same ratio, the same axis and opposite directions are interlocked together, and if two parallel planes are applied, in the direction tending to bring them closer together, against respectively two bearing surfaces belonging respectively to these two cams, the distance between these two planes remains constant during rotation of the assembly: in fact, each increase in the distance between the axis and one of these planes due to a given angular movement of said assembly corresponds to a reduction of the same amplitude of the distance between this axis and the other plane.

The two cams are chosen and mounted so that here the constant distance between the two considered planes is equal to D, which allows these two cams to be placed jointingly between the two bearing surfaces 6 and 7.

Under these conditions, with these two bearing surfaces being fixed, simple rotation of shaft 8 allows the height thereof to be varied with respect to said bearing surfaces, and so the height of the sitting portion directly above the considered mechanism.

It is of course necessary for the control in question of the rotation of shaft 8 to be irreversible, i.e. for the stresses exerted vertically on shaft 8 and the cams which are integral therewith not to be able to cause these cams to rotate.

To this end, it suffices to give to the angle of inclination of the spiral a sufficiently small value: if we consider the straight line which corresponds to the development of the effective spiral arc for each cam on a graph showing, from the origin 0 of this arc, as ordinates the radii and as abscissa the corresponding circular movements of point 0, the slope of this straight line is advantageously of the order of 7° only.

To obtain such a result and at the same time, nevertheless, on the one hand considerable vertical travel for the mechanism and, on the other hand, a relatively small bulk for the cams, the effective area of each cam is given an angular extent of 360°, which confers thereon the general form of a thick comma.

In such a case, for a vertical travel of the mechanism of about 30 mm, distance D is of the order of 60 mm and for the radius of the cam a value is chosen increasing along this latter from about 15 mm to about 45 mm.

In the embodiment illustrated, the frame of the base comprises two longitudinal angle-irons 12 extending parallel to one another on each side of the seat, the upper bearing surface 6 of the above mechanism is a lug integral with the vertical flange 13 of such an angle-iron and its lower bearing surface 7 is formed by a stepped edge of a slot 14 formed in the horizontal flange 15 of this angle-iron.

The two cams 10 and 11 are cut out from plates of constant thickness and are jointingly juxtaposed, cam 10 extends against the vertical flange 13 and has an area abutting the upper bearing surface 6 and slot 14 comprises, on the one hand an elongated portion through which this cam 10 passes longitudinally for its low positions, and, on the other hand, a portion, shorter in the longitudinal direction, through which passes cam 11 for its low positions, the stepped edge 7 supporting this cam 11 and being placed in the longitudinal extension of said short portion, along said elongated portion.

Shaft 8 is connected to the base 1 along the longitudinal direction of the seat and not vertically, being jointingly overlapped for this purpose by an aperture 16 with parallel vertical edges formed in flange 13.

It should be noted that such guiding could not be provided at one and the same time for the front mechanism and for the rear mechanism because the modifications of inclination of the sitting portion cause modifications of the longitudinal horizontal distance between the axes of the two shafts 8: this is why, if front shaft 8 is jointingly overlapped by an aperture 16, as is the case in FIG. 2, rear shaft 8 is overlapped with play by another aperture 17 with parallel vertical edges, which allows this rear shaft to effect small horizontal movements during variations in inclination of the sitting portion.

It should also be noted that, because of these small horizontal movements of one of shafts 8, bearing surfaces 6 and 7 against which are applied cams 10 and 11 connected to this shaft are of necessity horizontal to avoid jamming effects: accordingly, and since the tangent at each point of each cam is not perpendicular to the corresponding radius, the zones of contact between said bearing surfaces and the cams are slightly offset horizontally with respect to the vertical plane passing through the axis of the corresponding shaft 8.

The very small inclination given to the spiral of each cam for purposes of irreversibility has the additional advantage of only requiring very small torques for controlling the rotation of these cams: these torques may then be generated very easily with little gearing down or from small electric motors associated with reducing trains adapted to transmit relatively small torques and formed for example from plastic material gears.

It is this last assumption which has been chosen in the embodiment illustrated, where there is shown schematically at 18 the shaft of such an electric motor used for driving one of shafts 8, and at 19 a train of reducing gears placed between shafts 18 and 8.

On the assumption of an electric control, and according to a particularly advantageous arrangement of the invention, six distinct controls are provided respectively enabling:

A—the rear of the seat alone to be raised,
B—the rear of the seat alone to be lowered,
C—the seat to be raised parallel to itself,
D—the seat to be lowered parallel to itself,
E—the front of the seat alone to be raised,
F—the front of the seat alone to be lowered.

These six controls are preferably obtained by actuating respectively six keys $20_A$, $20_B$, $20_C \ldots 20_F$ (FIG. 5) disposed on the side of the seat and gathered together in a keyboard having two superimposed lines comprising three keys each, the two keys disposed at the rear of this keyboard corresponding to the height adjustment of the rear alone of the seat, the two keys in the centre corresponding to the height adjustment of the seat parallel to itself, and the two keys at the front corresponding to the height adjustment of the front of the seat.

Each of the pairs of keys thus defined may be formed by a single rocker.

Each of the six keys may furthermore carry an upward or downward pointing arrow representing the control which it ensures.

To avoid any false manoeuvre, the electrical circuit is advantageously arranged so that the control of one of the two central keys has always priority over all the other controls and automatically neutralizes these latter.

Figure 5:
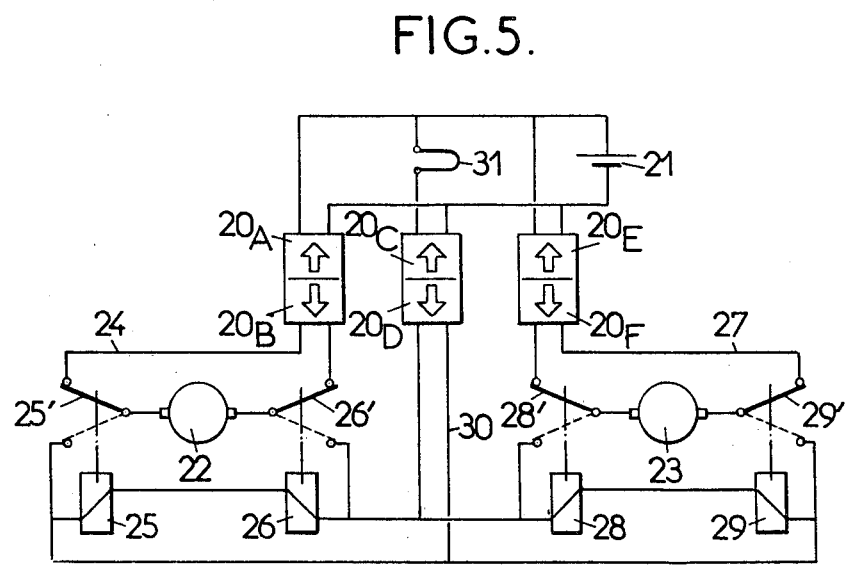
FIG. 5 is an electric control diagram for such a device also in accordance with the invention.

To this end the circuit shown schematically in FIG. 5 may be used which comprises:

a DC electric source 21, two motors 22 and 23 used respectively for controlling the rear mechanism and the front mechanism, a circuit 24 connecting motor 22 to source 21 through, on the one hand, a first change-over switch actuatable by keys $20_A$ and $20_B$ and, on the other hand, the mobile contacts 25' and 26' of two relays 25 and 26, when these latter are de-energized, a circuit 27 connecting motor 23 to source 21 through, on the one hand, a second change-over switch actuatable by the two keys $20_E$ and $20_F$ and, on the other hand, the mobile contacts 28' and 29' of two relays 28 and 29, when these latter are de-energized, and a circuit 30 connecting at one and the same time to source 21, through a third change-over switch actuatable by the two keys $20_C$ and $20_D$, on the one hand all the relays 25, 26, 28 and 29 which en-energizes them and, on the other hand, additionally through the mobile contacts of these four relays then energized, the two motors 22 and 23.

Under these conditions:

the actuation of each of the end keys $20_A$, $20_B$, $20_E$ and $20_F$ results in supplying with power a single motor in a well-defined direction, which raises or lowers the front or rear end of the seat, in one of the four directions shown by the arrows AV and AR in FIG. 1, the actuation of one of the central keys $20_C$ and $20_D$ results in cutting off the power supply to the motors through the other keys and in supplying with power simultaneously the two motors in the same direction, which moves the seat upwards or downwards parallel to itself, according to arrow P in FIG. 1.

There is shown schematically at 31 in FIG. 5 a safety device sensitive for example to the overheating of the motors allowing automatic interruption of any movement of the seat in the height direction parallel with itself when one of the two mechanisms controlled by these two motors reaches the end of its travel.

Following which, whatever the embodiment adopted, there is finally provided a device for adjusting the height and inclination of a seat whose construction, operation and advantages, particularly the simplicity of manufacture, the continuity of the adjustments, the fact that it lends itself to electric control and the flexibility of this control, follow sufficiently from what has gone before.

As is evident, and as it follows moreover already from what has gone before, the invention is in no wise limited to those of its modes of application and embodiments which have been more specially considered; it embraces, on the contrary, all variations thereof, particularly those where the horizontal bearing surfaces adapted to co-act with the cams are mounted on the frame of the sitting portion instead of on the frame of the base, the cam shafts being then connected vertically to the frame of the base instead of to the frame of the sitting portion.

We claim:

1. A device for adjusting the height and/or inclination of a sitting portion of a seat, for example, a vehicle seat, of the type including a base for securing the seat to a floor, said adjusting device comprising in combination:

lower frame means for securing said seat to said base including right and left horizontally separated frame members;

front adjusting means for adjusting the position of the front portion of said seat relative to said floor, said front adjusting means including;

front means rigidly defining upper and lower vertically separated horizontal load-bearing surfaces associated with said right and left frame members;

a front shaft slidably received between said right and left frame members to permit vertical displacement of said front shaft relative said lower frame means; and first and second front cam means each constantly and slidingly engageable between said upper and lower front load-bearing surfaces of an associated one of said right and left frame members, respectively, each of said first and second front cam means including first and second substantially identical front spiral means each defining a flat Archimedes spiral rigidly and coaxially attached to said front shaft in opposing directions relative to one another so that said front shaft is vertically displaced upon rotation thereof;

rear adjusting means for adjusting the position of the rear portion of said seat relative to said floor, said rear adjusting means including;

rear means rigidly defining upper and lower vertically separated horizontal load-bearing surfaces associated with said right and left frame members;

a rear shaft slidably received between said right and left frame members to permit vertical displacement of said rear shaft relative to said lower frame means; and first and second rear cam means each constantly and slidingly engageable between said upper and lower rear load-bearing surfaces of an associated one of said right and left frame members, respectively, each of said first and second rear cam means including first and second substantially identical rear spiral means each defining a flat Archimedes spiral rigidly and coaxially attached to said rear shaft in opposing directions relative to one another so that said rear shaft is vertically displaced upon rotation thereof;

front shaft rotating means for rotating said front shaft;

rear shaft rotating means for rotating said rear shaft;

engaging means for selectively operating said front and/or rear shaft rotating means thereby selectively adjusting the height and/or inclination of said seat sitting portion relative said floor; and upper frame means pivotably connected to said front and rear shafts for supporting said seat so that upon rotation of said front and/or rear shafts, said upper frame means will be responsively displaced relative to said lower frame means by virtue of said front and/or rear shafts being vertically displaced so as to adjust the height and/or inclination of said seat sitting portion relative said floor.

2. An adjusting device as in claim 1 wherein the slope of a straight line corresponding to the developed curve of the Archimedes spiral of each of said first and second front spiral means and said first and second rear spiral means is about 7°.

3. An adjusting device as in claim 2 wherein the effective area of each of said first and second front spiral means and said first and second rear spiral means extends over an angle of 360°.

4. An adjusting device as in claim 1 wherein each of said upper and lower front load-bearing surfaces and said upper and lower rear load-bearing surfaces are vertically separated by a predetermined distance D, and wherein parallel planes respectively tangent to any opposing points on said first and second front and rear spiral means are similarly separated by said distance D.

5. An adjusting device as in claim 4 wherein the height of adjustment of each of said front and rear adjusting means is of the order of 30 mm, which corresponds to a radius of said first and second front spiral means and said first and second rear spiral means increasing from about 15 to about 45 mm and to said distance D of about 60 mm.

6. An adjusting device as in claim 1 wherein each of said right and left frame members includes two longitudinal angle-irons having a vertical flange and a horizontal flange, said front and rear upper load-bearing surfaces of each being a lug intergral with said vertical flange, and said front and rear lower load-bearing surface being the stepped edge of a slot defined in the horizontal flange, said slot adapted to let portions of the respectively associated spiral means pass therethrough.

7. An adjusting device as in claim 1 wherein a predetermined one of said front or rear shafts is slidingly engageable with apertures having vertical parallel edges defined in each of said right and left frame members and the other of said front or rear shafts includes means for mounting said other shaft relative to said lower frame member so that said other shaft can move slightly in the longitudinal direction of said seat.

8. An adjusting device as in claim 1 wherein said front and rear shaft rotating means include front and rear motor means for rotating said front and rear shafts, respectively.

9. An adjusting device as in claim 8 wherein said engaging means includes:

electrical power source means for providing a source of electrical power;

first switching means for coupling said source means to said rear motor means to thereby responsively turn said rear shaft in a direction to either raise or lower said rear seat portion relative to said floor;

second switching means for coupling said source means to said front and rear motor means to thereby concurrently and responsively turn said front and rear shafts in a direction to either raise or lower said seat sitting portion relative to said floor; and third switching means for coupling said source means to said front motor means to thereby responsively turn said front shaft in a direction to either raise or lower said front seat portion relative to said floor.

10. An adjusting device as in claim 1 or 9 wherein said front and rear shaft rotating means further include limit means for automatically stopping rotation of said front and rear shafts, respectively, upon either of said front or rear adjusting means reaching its respective travel limit.

11. An adjusting device as in claim 9 wherein said engaging means further includes circuit means for giving engaging priority to said second switching means over said first and third switching means.

12. An adjusting device as in claim 9, wherein said first, second and third switching means are sequentially aligned on the side of the seat from the rear to the front thereof, and each carries an arrow directed upwards or downwards corresponding to the desired control ensured by pressing on a predetermined arrow.

* * * * *